Sept. 20, 1932.  V. P. SCHMIDT ET AL  1,878,296
CENTERING GAUGE
Filed June 9, 1931    2 Sheets-Sheet 2
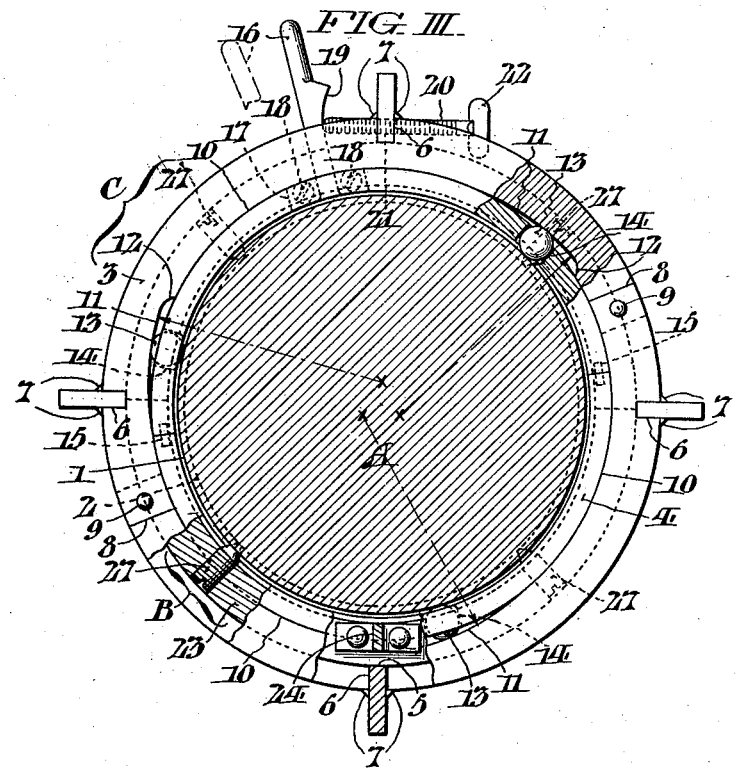
FIG. III
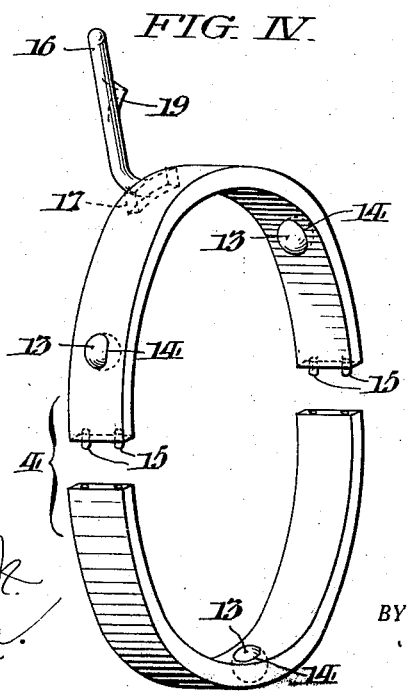
FIG. IV
INVENTORS:
Victor P. Schmidt &
Harry A. Brennan.

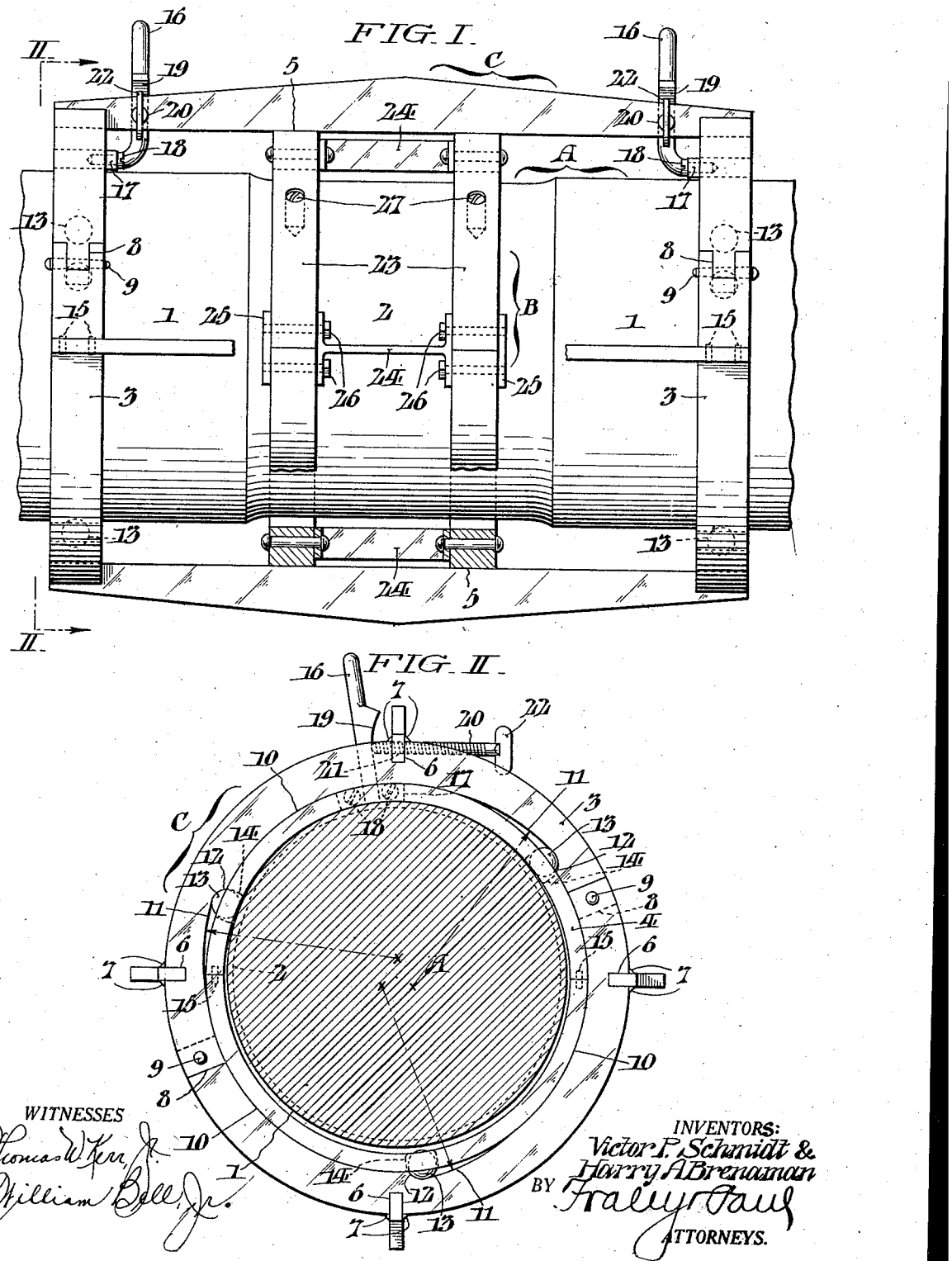

Patented Sept. 20, 1932

1,878,296

UNITED STATES PATENT OFFICE

VICTOR P. SCHMIDT AND HARRY A. BRENAMAN, OF ALTOONA, PENNSYLVANIA

CENTERING GAUGE

Application filed June 9, 1931. Serial No. 543,047.

This invention relates to centering gauges and more particularly to gauges used for centering annular objects upon shafts which are wholly or partly cylindrical. The invention is especially applicable to the centering of annular bearings upon a locomotive axle preparatory to the assembling of a revolving tool thereon, for performing a grinding or other similar operation upon the journals of the axle. Such a tool is shown in our copending application for U. S. Letters Patent, Serial No. 543,046, filed June 9, 1931.

The primary object of the invention is to provide a gauge of this type characterized by simplicity of construction, with resulting economy in the manufacture of its constituent parts; ease of assembling; and accuracy in setting.

A further object of the invention is to provide in such a gauge means for locking a ring of fixed diameter in concentric relation to a cylindrical shaft, the diameter of which may vary within certain limits.

Other objects and advantages characteristic of our invention will become more fully apparent from the description of one embodiment or example thereof which follows hereinafter, and which has reference to the accompanying drawings.

Of the drawings:

Fig. I represents a side elevation of a centering gauge of our invention in assembled position upon a locomotive axle.

Fig. II represents an end elevation of the same.

Fig. III represents a similar end elevation with certain parts broken away to show the relation between the centering gauge and the device to be centered on the axle; and, Fig. IV represents a perspective view of a ball-retaining ring which forms a part of the centering gauge, the two sections of the ball-retaining ring being shown in a separated position.

The locomotive axle is designated at A and comprises a cylindrical portion 1, which may be assumed to constitute a journal about to be trued to accurate dimensions by a grinding tool, such as shown in our pending application previously referred to. Adjacent to the journal 1 there is a cylindrical portion 2 of less diameter upon which an annular bearing B is to be mounted in concentric relation with the axle as a step preparatory to assembling thereon the complete grinding machine. Of course, however, the centering gauge of this invention will be found to have many other applications than the particular one to which reference is here made for the purpose of illustrating one example of the use of the gauge.

The centering gauge C comprises generally two parallel spaced centering rings 3, ball-retaining rings 4, and a number of straight edges 5 connecting the centering rings. The straight edges 5 in the example herein illustrated, which are four in number, are formed in the shape of flat bars tapering in width from the center towards the ends. Upon the centering rings 3 there are radially disposed slots 6 which accommodate the ends of the straight edges 5 in equally spaced relation. A preferred method of securing the straight edges 5 within their respective slots 6 is by welding at 7.

The centering rings 3 which are counterparts of each other comprise split sections assembled together about the axle A by means of tongue and groove joints 8 through which slightly tapered pins 9 are inserted. These rings 3 are preferably made in two or more pieces to permit their application to locomotive or car axles to which wheels are permanently attached. The inner surface of each ring 3 is annular throughout the areas designated at 10, and between these areas there are eccentric depressions 11 symmetrically spaced and defined by the arcs of circles drawn from centers $x$, as indicated by the radii shown in broken lines. At the end of each eccentric depression 11 there is a circular cavity 12 within which the balls 13 of the ball-retaining ring 4 are initially accommodated when the gauge is first applied to the shaft.

Each retaining ring 4 together with the balls 13 carried thereby constitutes a ball race fitting snugly within and revolving on the annular inner surfaces 10 of the companion centering ring 3. The balls 13 (or roller members, or alternatively, wedge members, as we prefer to designate them because their function is more important than their particular shape) are equally spaced about the retaining ring 4 and are held in curved sockets 14. While in the present example of the invention three such roller members 13 are shown for each retaining ring 4, there being a corresponding number of eccentric depressions 11 in the companion centering ring 3, it may, however, be found desirable to employ four or more roller members, and such is within the contemplation of this invention. The retaining rings 4, as shown in Fig. IV, are also made up of split sections joined together at their ends by keys 15.

To revolve a retaining ring 4 within its companion centering ring 3, and hence to move the balls into wedging engagement between the cylindrical surface 1 of the axle and the eccentric depressions 11, a handle 16 is provided. This handle 16 is attached to the retaining ring 4 by means of a plate 17 and screws 18. Each handle 16 is provided with a reinforced portion having an arcuate surface 19 which is adapted to be engaged by a thumb screw 20. The screw 20 is inserted in a correspondingly threaded hole 21 in one of the straight edges 5, and said screw is provided at its ends with a wing piece 22 which is conveniently engaged by the thumb and fingers of the operator for turning the same.

As shown in Fig. I, the annular bearing B to be centered on the axle A comprises a pair of split rings 23 spaced in parallel relation by means of connecting members 24. The sections of each split ring 23 are secured to each other, as well as spaced from the other ring, by means of plates 25 and bolts 26. To affix the bearing rings 23 upon the axle A, machine screws 27 are provided, there being four such screws for each ring, as shown in Fig. III.

The operation of the centering gauge is as follows. The split sections of the annular bearing rings 23 are first secured together around the portion 2 of the axle A with the screws 27 in outwardly extended positions so as not to engage the axle. Subsequently the parts of the centering rings 3 are joined together by means of the tapered pins 9, and the retaining rings 4 are assembled and inserted within the centering rings 3. In the initial position the balls 13 of the retaining rings 4 will be accommodated within the circular ends of the eccentric depressions 11. Assuming that the axle is of slightly less diameter than that shown in the drawings (which is the maximum diameter to which the gauge may be applied), the retaining rings 4 are revolved within their respective centering rings 3 by means of the handles 16, which are moved in a counter-clockwise direction as viewed in Fig. III. This causes the balls 13 to move simultaneously along their respective eccentric surfaces 11 which in turn causes the balls 13 to move inwardly towards the axle A until they are wedged into intimate engagement between the axle A and the centering ring 3. When each centering ring 3 has thus been clamped in concentric relation to the axle A, the thumb screws 20 are drawn up by turning the same until their ends strike the arcuate surfaces 19 of the handles 16, or the thumb screws 20 may be used in lieu of the handle 16 for making a final adjustment of the relative positions of the retaining rings 4 and the centering rings 3. In either event, the thumb screws 20 regulate the final positions of the two rings. When the thumb screws 20 have been turned to pressure engagement with the handles 16, the retaining rings 4 become locked with respect to their centering rings 3. If the axle A should be somewhat smaller in diameter than that shown in the drawings, the handles 16 will, when the gauge is locked, occupy some such position as that shown in broken lines in Fig. III.

Meanwhile the annular bearing rings 23, which are of such dimensions that they fit accurately between the straight edges 5, have been automatically adjusted by reason of their engagement with the straight edges 5 to assume a concentric relation to the journal 1 of the axle A. With the parts of the centering gauge locked, the screws 27 of the annular bearing rings 23 are forced into engagement with the portion 2 of the axle. Accordingly, the annular bearing B is securely attached to the axle in the desired position.

In removing the gauge from the axle, the screw 20 is turned in the reverse direction which allows the balls 13 to slip backward towards the circular sockets 12. Subsequently the sections of the centering rings 3 and of the retaining rings 4 are separated and the parts are removed from the axle. After the gauge has been removed the grinding machine previously referred to may be mounted on the annular bearing B.

While we have described our invention with regard to one example thereof, it will be apparent that various changes may be made in the form of the constituent parts of the apparatus as herein described without departing from the spirit of our invention as defined in the claims hereto annexed. It will be further apparent that the centering gauge may be adapted for use in connection with the centering of annular objects upon shafts of a variety of forms.

Having thus described our invention, we claim:

1. A gauge for centering an object upon a shaft comprising a centering ring having inner cam surfaces, a straight edge carried by said centering ring, roller members adapted to engage said cam surfaces of the ring and a portion of the shaft, and means for simultaneously advancing said roller members on said cam surfaces to clamp the ring in concentric relation to the shaft.

2. A gauge for centering an object upon a shaft comprising a centering ring having inner cam surfaces, a straight edge carried by said centering ring, roller members adapted to engage said cam surfaces of the centering ring and a portion of the shaft, and a retaining ring connecting said roller members, said retaining ring being revolvable within said centering ring to advance the position of said roller members on said cam surfaces whereby the centering ring may be clamped in concentric relation to the shaft.

3. A gauge for centering an object upon a shaft comprising a centering ring having an annular inner surface with spaced depressions therein, said depressions having surfaces eccentric to said annular surface, a straight edge carried by said centering ring, roller members housed in said depressions and adapted to bear upon a portion of the shaft, and means guided by the annular inner surface of said centering ring for simultaneously advancing said roller members in said depressions to clamp the centering ring in concentric relation to the shaft.

4. A gauge for centering an object upon a shaft comprising a centering ring having an annular inner surface with spaced depressions therein, said depressions having surfaces eccentric to said annular surface, a straight edge carried by said centering ring, roller members housed within said depressions and adapted to bear upon a portion of a shaft, and a retaining ring connecting said roller members, said retaining ring being revolvable on the annular inner surface of said centering ring to advance the position of said roller members on said depressions whereby the centering ring may be clamped in concentric relation to the shaft.

5. A gauge for centering an object upon a shaft comprising a centering ring having inner cam surfaces, a straight edge carried by said centering ring, roller members adapted to engage said cam surfaces of the centering ring and a portion of the shaft, a retaining ring connecting said roller members, said retaining ring being revolvable within said centering ring to advance the position of said roller members on said cam surfaces, and means for locking said retaining ring with respect to said centering ring in revolved position.

6. A gauge for centering an object upon a shaft comprising a centering ring having inner cam surfaces, a straight edge carried by said centering ring, roller members adapted to engage said cam surfaces of the ring and a portion of the shaft, a retaining ring connecting said roller members, said retaining ring being revolvable within said centering ring to advance the position of said roller members on said cam surfaces, a handle on said retaining ring, and means for regulating the position of said handle with respect to a fixed point on the centering ring, thereby determining the positions occupied by said roller members on said cam surfaces.

7. A gauge for centering an object upon a shaft comprising a centering ring having inner cam surfaces, a straight edge carried by said centering ring, roller members adapted to engage said cam surfaces of the ring and a portion of the shaft, a retaining ring connecting said roller members, said retaining ring being revolvable within said centering ring to advance the position of said roller members on said cam surfaces, a handle on said retaining ring formed with an arcuate surface and a screw carried by the centering ring adapted to engage said arcuate surface for regulating the position of said handle with respect to a fixed point on the centering ring, thereby determining the positions occupied by said roller members on said eccentric surfaces.

8. A gauge for centering an object upon a shaft comprising a split ring having inner cam surfaces, a straight edge carried by said split ring, balls engaging said cam surfaces and adapted to bear upon a portion of the shaft, and means for simultaneously advancing said balls on said cam surfaces to clamp the ring in concentric relation to the shaft.

9. A gauge for centering an object upon a shaft comprising a pair of parallel spaced rings, having inner cam surfaces, a connection between said rings in the form of a straight edge, wedge members adapted to be interposed between the shaft and said cam surfaces of the ring, and means for advancing said wedge members together along said cam surfaces to clamp said rings in concentric relation to the shaft.

10. A gauge for centering an object upon a shaft comprising a pair of parallel spaced centering rings having inner annular surfaces with spaced cavities therein, said cavities having surfaces eccentric to said annular surfaces, a straight edge connecting said centering rings, roller members interposed between the shaft and said cavities of the centering rings, and retaining rings carrying said roller members and revolvable on said centering rings to vary simultaneously the positions of said roller members within their respective cavities.

11. A gauge for centering an object upon a shaft comprising a pair of parallel spaced centering rings having inner annular surfaces with spaced cavities therein, said cavities having surfaces eccentric to said annular surfaces, a straight edge connecting said centering rings, roller members interposed between the shaft and said cavities of the centering rings, retaining rings carrying said roller members and revolvable on said centering rings to vary simultaneously the positions of said roller members within their respective cavities, and means for locking said retaining rings with respect to said centering rings in revolved positions.

12. A gauge for centering an object upon a shaft comprising a pair of parallel spaced centering rings having inner annular surfaces alternating with eccentric surfaces, a straight edge connecting said centering rings, ball races revolvable on said annular surfaces of said centering rings with the balls thereof engaging said eccentric surfaces, and means for locking said ball races with respect to said centering rings in revolved positions.

13. A gauge for centering an object upon a shaft comprising a pair of parallel spaced centering rings having inner annular surfaces alternating with eccentric surfaces, a straight edge connecting said centering rings, ball races revolvable on said annular surfaces of said centering rings with the balls thereof engaging said eccentric surfaces, and thumb screws for regulating the relative positions of said ball races and centering rings.

In testimony whereof, we have hereunto signed our names at Altoona, Pennsylvania, this 27th day of May, 1931.

VICTOR P. SCHMIDT.
HARRY A. BRENAMAN.